US006434281B1

(12) United States Patent
Sakaegi

(10) Patent No.: US 6,434,281 B1
(45) Date of Patent: Aug. 13, 2002

(54) SIGNAL PROCESSING APPARATUS

(75) Inventor: Yuji Sakaegi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/229,439

(22) Filed: Jan. 13, 1999

(30) Foreign Application Priority Data

Jan. 20, 1998 (JP) .......................................... 10-008682

(51) Int. Cl.[7] ............................ G06K 9/60; H04N 1/00; H04N 7/12
(52) U.S. Cl. ........................ 382/305; 382/299; 382/298; 382/236; 358/404; 358/403; 375/240.28; 375/240.02
(58) Field of Search ................................. 382/305, 298, 382/299, 295, 294, 278, 205, 207, 208, 232, 236, 240; 345/441, 613, 614, 615, 673; 348/55, 561, 581, 409.1, 412.1, 418.1, 422.1; 358/403, 404; 375/240.01, 240.02, 240.28, 241, 244

(56) References Cited

U.S. PATENT DOCUMENTS

| | | | | |
|---|---|---|---|---|
| 4,590,597 | A | | 5/1986 | Long-sheng et al. |
| 4,748,511 | A | * | 5/1988 | Nichols et al. ............ 358/256 |
| 5,048,101 | A | * | 9/1991 | Kuroru et al. ............. 382/41 |
| 5,184,241 | A | | 2/1993 | Schwemmer |
| 5,251,229 | A | | 10/1993 | Bennett, Jr. et al. |
| 5,384,643 | A | * | 1/1995 | Inga et al. ................ 358/403 |
| 5,387,992 | A | | 2/1995 | Miyazaki et al. |
| 5,420,637 | A | * | 5/1995 | Zeevi et al. ............... 348/409 |
| 5,521,987 | A | * | 5/1996 | Masaki .................... 382/218 |
| 6,091,426 | A | * | 7/2000 | Hauck et al. ............. 345/439 |

OTHER PUBLICATIONS

Article entitled "A Highly Accurate Frequency Counting System for 1.5 um Wavelength Semiconductor Lasers" by M. Kourogi et al., , Proceedings from the SPIE—Nov. 16–18, 1992, conference on Frequency–Stabilized Lasers and Their Applications.
Article entitled "Frequency–Stabilized Lasers—A Parochial Review" by John L. Hall, from the Nov. 16–18, 1992 SPIE Conference Proceedings, vol. 1837 by John L. Hall.
Article "Wide Span Optical Frequency Comb Generator for Accurate Optical Frequency Difference Measurement" by M. Kourogi et al. IEEE Journal of Quantum Electronics, vol. 29, No. 10, Oct. 1993, pp. 2693–2701.
Article entitled "Efficient Optical Frequency–Comb Generator" by A.S. Bell et al., Optics Letters, Jun. 15, 1995, vol. 20, No. 12, pp. 1435–1437.
Article entitled "A Coupled–Cavity Monolithic Optical Frequency Comb Generator" by M. Kourogi et al., IEEE Photonics Technology Letters, vol. 8, No. 132, 12/96.
Article "Sub–Doppler Optical Frequency Reference at 1.064 um by Means of Ultrasensitive Cavity Enhanced Frequency Modulation Spectroscopy of a C2HD Overtone Transition" by J. Long Sheng Ma et al., Optics Letters, vol. 2, No. 13, Jul. 1, 1996.
Article "Highly Selective Terahetrz Optical Frequency Comb Generator" by J. Long–Sheng Ma et al., Optics Letters, Mar. 1, 1997 vol. 22, No. 6, pp. 301–303.

* cited by examiner

Primary Examiner—Leo Boudreau
Assistant Examiner—Yosef Kassa
(74) Attorney, Agent, or Firm—Fitzpatrick, Cella, Harper & Scinto

(57) ABSTRACT

An input image signal is stored in a buffer memory by reducing the number of pixels of the image signal using a first timing signal. The image signal stored in the buffer memory is subjected to burst transfer and written in an image memory in accordance with the first timing signal. The image signal stored in the image memory is read in accordance with a second timing signal which is asynchronous with the first timing signal.

16 Claims, 4 Drawing Sheets

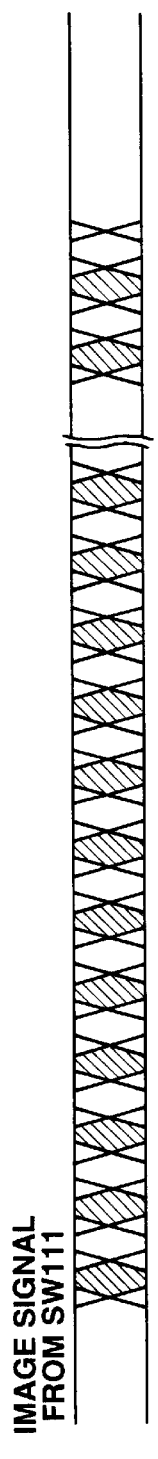
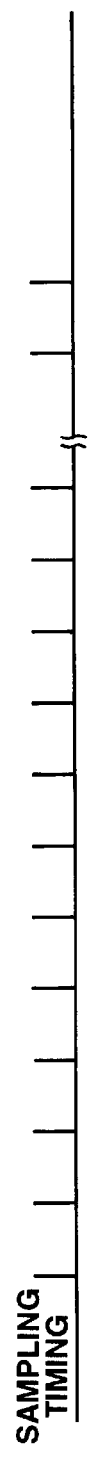
FIG.2A  IMAGE SIGNAL FROM SW111
FIG.2B  SAMPLING TIMING
FIG.2C

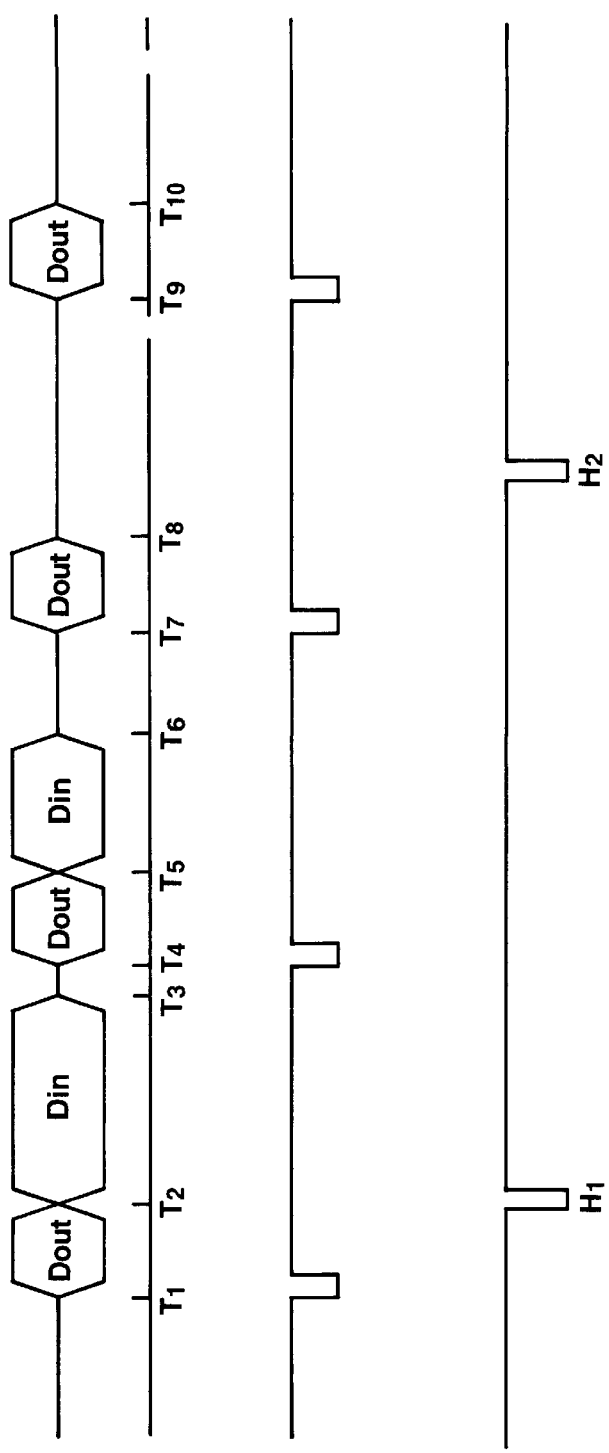

SIGNAL PROCESSING APPARATUS

BACKGROUND OF THE INVENTION

1. Field of the Invention

The present invention relates to a signal processing apparatus and an imaging apparatus. More particularly, the invention relates to processing and outputting a signal having a timing which is asynchronous with respect to input timing.

2. Description of the Related Art

In accordance with recent diffusion of personal computers, so-called digital cameras in which an image is recorded in a memory in the form of a digital signal are attracting notice as image input means for personal computers.

In digital cameras of this type, in general, an image signal obtained from a CCD (charge-coupled device), serving as an image pickup device, is converted into a digital signal, which is recorded in a memory by compressing the amount of digital information. Some digital cameras have the function of reproducing the recorded image signal and outputting the reproduced image signal to an external TV monitor, as well as the function of allowing confirmation of the currently photographed image on an incorporated monitor.

Recently, the tendency to provide digital cameras having higher-picture quality has accelerated. For that purpose, CCDs having a very large number of pixels are being used.

When the number of pixels of a CCD is increased in order to provide higher picture quality, a significant amount of time is required for reading an image signal from the CCD. In order to solve this problem, the clock frequency for driving the CCD may be increased. However, as the clock frequency increases, circuit elements, such as the CCD, an A/D (analog-to-digital) converter and the like, become more expensive.

Furthermore, when a significant amount of time is required for reading an image signal from the CCD, the frame rate, of a displayed image represented by the image signals decreases when displaying the image on an external monitor or an EVF (electronic view finder).

Hence, conventionally, when displaying an image on an external monitor or an EVF, the frame rate of the displayed image is increased by systematically reducing pixels of an image signal from the CCD, a simple integer ratio is provided between the frame rate of the image signal from the CCD and the frame rate of a display image signal, and the photographing system and the output system for the display image signal are driven in a synchronized state using the same timing signal in order to reduce circuit scale and simplify design.

FIG. 4 is a timing chart illustrating an example when driving the photographing system and the output system for display of the image signal in a synchronized state in the above-described manner. In the case of FIG. 4, the ratio of the frame rate of the image signal from the CCD to the frame rate of the display image signal is set to 1:2.

However, when circuitry is designed in order to satisfy the above-described condition, it is necessary to redesign the circuitry each time the number of pixels of the CCD changes because the synchronous timing of the image signal used in the photographing system and the synchronous timing of the image signal used in the external output system change.

In order to solve this problem, the photographing system and the external output system may be asynchronously driven. In such a case, however, a buffer storage having a very large capacity is required in consideration of changes in the timing between the photographing system and the external output system.

SUMMARY OF THE INVENTION

It is an object of the present invention to solve the above-described problems.

It is another object of the present invention to allow output of a signal at a timing which is asynchronous with input timing, with a simple configuration and without increasing circuit scale.

According to one aspect, the present invention which achieves these objectives relates to a signal processing apparatus including input means, first generation means for generating a first timing signal, reduction means for reducing a number of pixels of an input image signal using the first timing signal, a buffer memory for storing an image signal output from the reduction means, second generation means for generating a second timing signal which is asynchronous with the first timing signal, an image memory, and memory control means for writing the image signal stored in the buffer memory into the image memory in accordance with the first timing signal, and for reading the image signal stored in the image memory in accordance with the second timing signal.

According to another aspect, the present invention which achieves these objectives relates to an imaging apparatus including image pickup means for generating an image signal using a first timing signal, reduction means for reducing a number of pixels of the image signal obtained by the image pickup means, a buffer memory for storing an image signal output from the reduction means, an image memory, and memory control means for writing the image signal stored in the buffer memory into the image memory by performing burst transfer in accordance with the first timing signal, and for reading the image signal stored in the image memory in accordance with a second timing signal which is asynchronous with the first timing signal.

The foregoing and other objects, advantages and features of the present invention will become more apparent from the following detailed description of the preferred embodiment taken in conjunction with the accompanying drawings.

BRIEF DESCRIPTION OF THE DRAWINGS

FIGS. 2A–2C and 3A–3D are timing charts illustrating operations in the digital camera shown in FIG. 1.

DETAILED DESCRIPTION OF THE PREFERRED EMBODIMENT

A preferred embodiment of the present invention is described in detail below with reference to the drawings.

Figure 1:
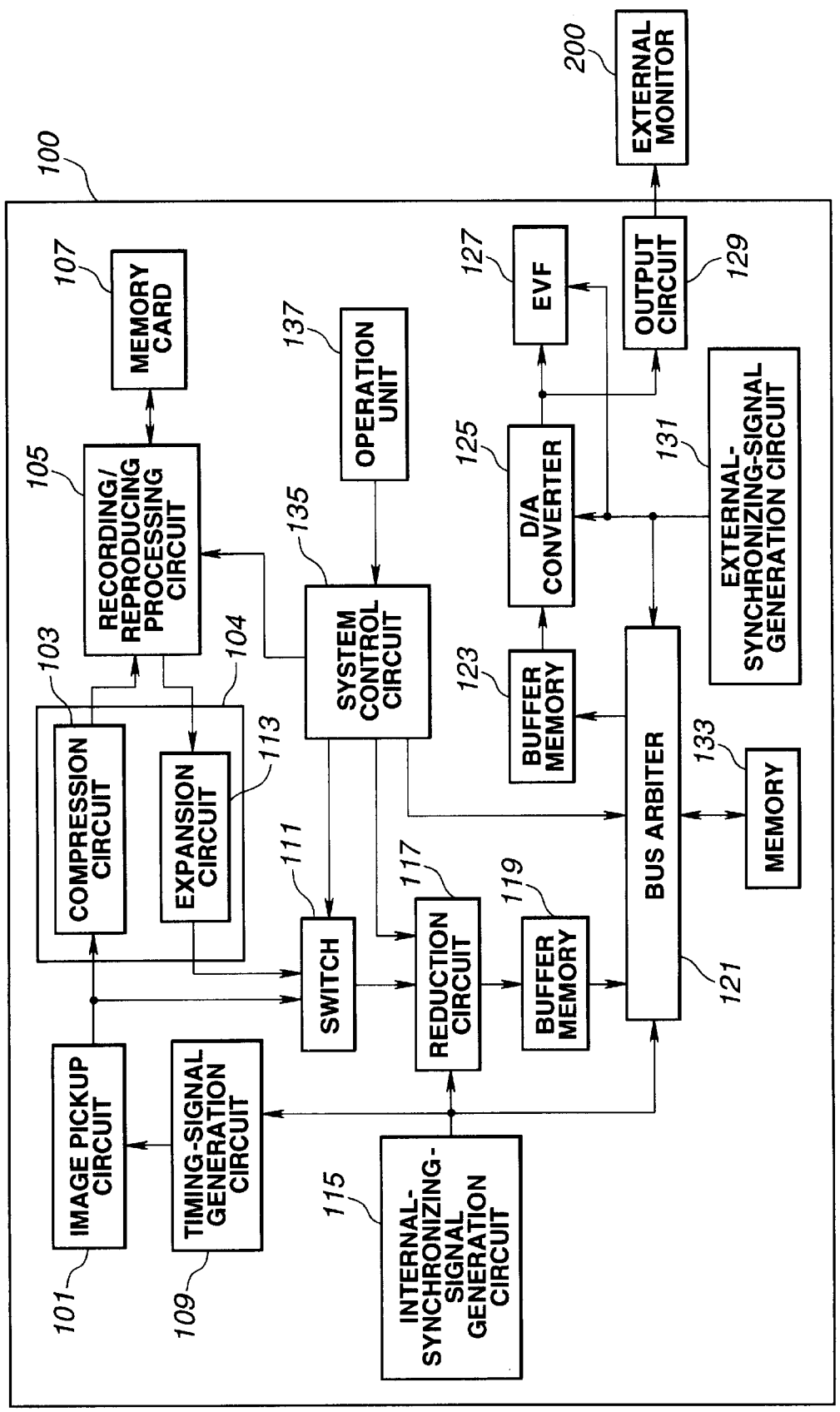
FIG. 1 is a block diagram illustrating the configuration of a digital camera according to an embodiment of the present invention.
Figure 4:
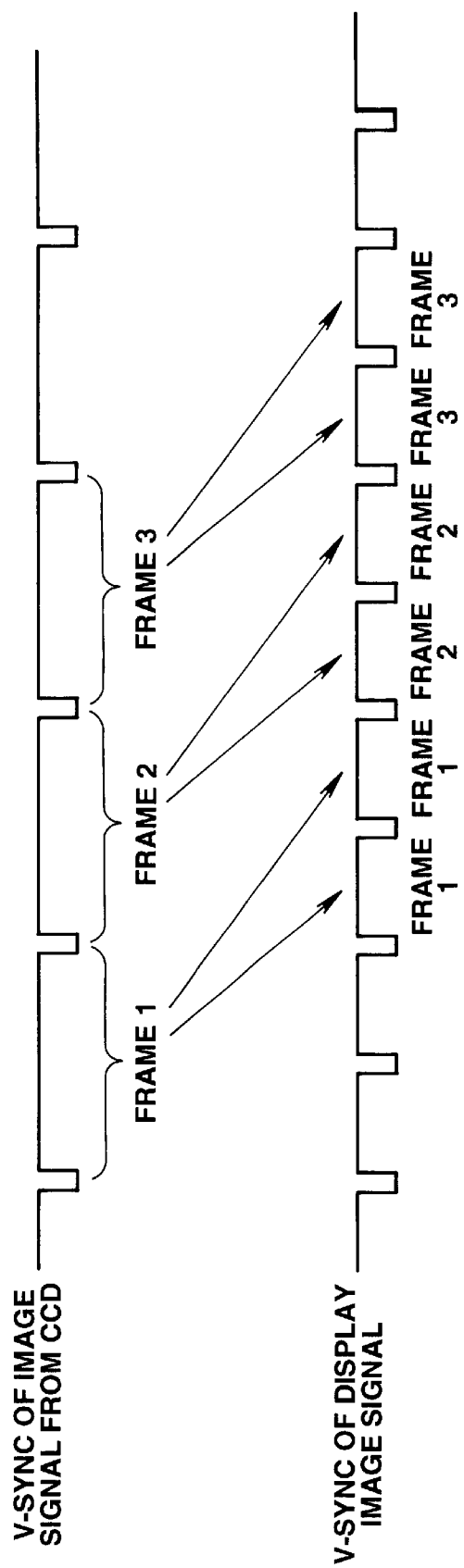
FIG. 4 is a timing chart illustrating frame rates of an image signal used in a photographing system and a display image signal.

FIG. 1 is a block diagram illustrating the configuration of a digital camera 100 according to the embodiment.

In the digital camera 100 shown in FIG. 1, it is possible to record a photographed image signal in a memory card by compressing the image signal, and to confirm an image being photographed on an incorporated monitor or an external monitor. It is also possible to read an image signal recorded in the memory card and expand the amount of information of the read image signal, and to confirm an image represented by the image signal on the incorporated monitor or the external monitor.

First, the processing during recording is described.

In FIG. 1, an image pickup circuit 101 includes a well-known CCD, a CDS circuit, an amplifier, an A/D converter and the like, and converts an image of an object into a digital signal comprising a plurality of bits per sample, and outputs the digital signal to a compression circuit 103 and a switch 111. An internal-synchronizing-signal generation circuit 115 generates an internal horizontal synchronizing signal and an internal vertical synchronizing signal, and outputs the generated signals to a timing-signal generation circuit 109, a reduction circuit 117 and a bus arbiter 121. The timing-signal generation circuit 109 generates timing signals for driving the image pickup circuit 101 using the synchronizing signals from the internal-synchronizing-signal generation circuit 115, and outputs the generated signals to the image pickup circuit 101. Accordingly, the respective circuit elements of the image pickup circuit 101 are driven in synchronization with the signals from the internal-synchronizing-signal generation circuit 115.

The compression circuit 103 encodes the digital signal by compressing the amount of information using the well-known DCT (dicrete cosine transform), variable-length encoding or the like, and outputs the resultant signal to a recording/reproducing processing circuit 105. The recording/reproducing processing circuit 105 converts the compressed/encoded image signal into a form suitable for recording while adding an ID signal and the like, based on a control signal output from a system control circuit 135 in accordance with an instruction from an operation unit 137, and writes the resultant signal into a memory card 107. The memory card 107, which includes a semiconductor memory, is detachably mountable with respect to the digital camera 100.

Next, the operation during reproducing processing is described.

Upon reception of an instruction of reproducing processing from the operation unit 137, the system control circuit 135 outputs a control signal to the recording/reproducing processing circuit 105. The recording/reproducing processing circuit 105 reads an image signal for one picture frame, recorded in the above-described manner, from the memory card 107, and outputs the read image signal to an expansion circuit 113. The expansion circuit 113 decodes the image signal read from the memory card 107 by performing processing inverse to the processing during recording processing while expanding the amount of information, and outputs the resultant signal to the switch 111.

The compression circuit 103 and the expansion circuit 113 constitute a compression/expansion circuit 104. The compression circuit 103 and the expansion circuit 113 may comprise the same circuit.

The selection operation of the switch 111 is controlled by the system control circuit 135. In reproducing processing, the switch 111 selects the output from the expansion circuit 113, and outputs the selected output to a reduction circuit 117. The reduction circuit 117 reduces the size of an image represented by the image signal from the expansion circuit 113 into a size of 640 pixels in the horizontal direction×480 pixels in the vertical direction, which is the size of an EVF 127 or an ordinary external TV monitor, by systematically reducing pixels of the image signal from the expansion circuit 113 in accordance with the synchronizing signals from the internal-synchronizing-signal generation circuit 115. The size of the reduced image may be arbitrarily set in accordance with the number of pixels to be displayed on an external monitor 200 or the EVF 127.

If the image signal obtained from the image pickup circuit 101 and the image signal read from the memory card 107 comprise 1,280 pixels in the horizontal direction×960 pixels in the vertical direction per picture frame, 75% of pixels constituting one picture frame are systematically removed by the reduction circuit 117.

The operation of the reduction circuit 117 is described with reference to FIGS. 2A–2C.

FIGS. 2A–2C are timing charts illustrating the operation of the reduction circuit 117. FIG. 2A illustrates an image-signal string input from the switch 111. The reduction circuit 117 generates clock pulses indicating a sampling timing shown in FIG. 2B, based on the horizontal synchronizing signal from the internal-synchronizing-signal generation circuit 115 shown in FIG. 2C, in order to sample the input image signal in accordance with these clock pulses. That is, portions of the image signal indicated by oblique lines in FIG. 2A are sampled by the reduction circuit 117 and are output to a buffer memory 119.

As described above, in this embodiment, in order to reduce 1,280 pixels in the horizontal direction of the input image signal to 640 pixels, pixels are systematically reduced to ½, and in order to reduce 960 pixels (lines) in the vertical direction to 480 pixels, pixels are systematically reduced to ½. That is, the reduction circuit 117 samples the image signal at every other horizontal period, and outputs the resultant signal to the buffer memory 119.

The image signal stored in the buffer memory 119 is read by a bus arbiter 121 and is written into an image memory 133. The bus arbiter 121 incorporates a data bus, and concentrates the image signal, which has been reduced by the reduction circuit 117 and stored in the buffer memory 119, in a burst-like form in accordance with the synchronizing signals from the internal-synchronizing-signal generation circuit 115, and transfers the resultant signal to the image memory 133.

The bus arbiter 121 also concentrates the image signal stored in the image memory 133 in a burst-like shape in accordance with synchronizing signals from an external-synchronizing-signal generation circuit 131 which are generated at a timing asynchronous with the synchronizing signals from the internal-synchronizing-signal generation circuit 115, and transfers the resultant signal to a buffer memory 123.

The image signal written in the buffer memory 113 in the concentrated form is output to a D/A converter 125 by being expanded on the time base, to be converted into an analog signal in accordance with the synchronizing signals from the internal-synchronizing-signal generation circuit 131 and to be output to the EVF 127 and an output circuit 129. The EVF 127 displays an image comprising 640 pixels×480 pixels represented by the image signal from the D/A converter 125 in accordance with the synchronizing signals from the external-synchronizing-signal generation circuit 131. The output circuit 129 converts the image signal from the D/A converter 125 in a form suitable for processing in an external monitor 200 by amplifying the level of the image signal while adding synchronizing signals thereto, and outputs the resultant signal to the external monitor 200.

A description will now be provided of the processing of transferring the image signal from the buffer memory 119 to the image memory 133 by the bus arbiter 121, and the processing of transferring the image signal from the image memory 133 to the buffer memory 123 by the bus arbiter 121.

FIGS. 3A–3D are timing charts illustrating the transfer operations of the bus arbiter 121.

FIG. 3A illustrates data flowing through the data bus within the bus arbiter 121, and FIG. 3C illustrates the horizontal synchronizing signal from the external-synchronizing-signal generation circuit 131.

As described above, in this embodiment, the reduction circuit 117 reduces the size of the image signal by about 75%, during a time period in which the data bus is not used.

Accordingly, in this embodiment, the bus arbiter 121 performs control so as to transfer the image signal to the buffer memory 123 in synchronization with the synchronizing signals from the external-synchronizing-signal generation circuit 131, and concentrate the image signal stored in the buffer memory 119 in a burst-like form and transfer the resultant image signal to the image memory 133 utilizing a time period during which the image signal is not transferred from the image memory 133 to the buffer memory 123, in synchronization with the synchronizing signals from the internal-synchronizing-signal generation circuit 115 generated asynchronously with the synchronizing signals from the external-synchronizing-signal generation circuit 131 as shown in FIG. 3D.

That is, as shown in FIGS. 3A–3D, data $D_{out}$ for four lines are transferred from the image memory 133 to the buffer memory 123 during periods of $T_1$–$T_2$, $T_4$–$T_5$, $T_7$–$T_8$, and $T_9$–$T_{10}$ in accordance with the horizontal synchronizing signal from the external-synchronizing-signal generation circuit 131.

The image signal output from the buffer memory 119 during other periods is transferred to the image memory 133.

That is, in FIGS. 3A–3D, after transferring the image signal from the buffer memory 119 during the period of $T_2$–$T_3$ in synchronization with the horizontal synchronizing signal from the internal-synchronizing-signal generation circuit 115 shown in FIG. 3D, the remaining portion of the image signal is transferred during the next horizontal synchronizing period $T_5$–$T_6$. During these periods of $T_2$–$T_3$ and $T_5$–$T_6$, the image signal for one horizontal line stored in the buffer memory 119 is transferred to the image memory 133.

As described above, the image signal is written in the buffer memory 119 by being systematically reduced for every line in the vertical direction by the reduction circuit 117. Hence, after transferring the image signal from the buffer memory 119 in accordance with the internal horizontal synchronizing signal $H_1$ shown in FIG. 3D, the bus arbiter 121 does not transfer the image signal from the buffer memory 119 at the pulse $H_2$.

Accordingly, the buffer memory 119 may only have a capacity capable of storing an image signal for one horizontal line after being reduced. Similarly, the buffer memory 123 may only have a capacity for one horizontal line.

In this embodiment, since it is possible to perform time-division use of the data bus for the transfer of the image signal from the buffer memory 119 to the image memory 133 and the transfer of the image signal from the image memory 133 to the buffer memory 123 in the above-described manner, the image memory 133 may comprise an inexpensive single-port memory.

When displaying an image represented by the image signal obtained by the image pickup circuit 101 on the EVF 127 or the external monitor 200, the switch 111 is switched by the system control circuit 135 in accordance with an instruction from the operation unit 137, in order to transfer the image signal from the image pickup circuit 101 to the reduction circuit 117. Thereafter, the same processing as in the operation of reproducing an image signal from the memory card 107 is performed, and the image obtained from the image pickup circuit 101 is displayed on the EVF 127. The user instructs recording through the operation unit 137 while monitoring the image displayed on the EVF 127. An image signal for one picture frame is recorded in the memory card 107 at a timing corresponding to the instruction of recording in the above-described manner.

As described above, in this embodiment, when monitoring a photographed image signal or an image having a large number of pixels (i.e., a high-definition image) reproduced from a memory card at a timing asynchronous with a timing in a photographing system or a recording/reproducing system, the image signal is transferred to an image memory by reducing the number of pixels and concentrating the image signal in a burst-like shape. Hence, it is possible to monitor the image without performing a large design change, even when the number of pixels of the image signal dealt with in the photographing system changes and the operational clock frequency thereby changes. Furthermore, the capacity of a buffer memory need not be large.

Since the amount of data input/output to/from the image memory 133 is reduced by reducing the number of pixels, it is possible to use an inexpensive low-speed memory, and to construct an inexpensive system.

Although in the foregoing embodiment, the case of reducing the number of pixels of the image signal dealt with in the photographing system or the recording/reproducing system to ½ both in the horizontal and vertical directions has been described, the number of pixels may be reduced to any other appropriate ratio with the same effects as in the foregoing embodiment.

Although in the foregoing embodiment, the case of applying the present invention to a digital camera has been described, the present invention may be applied to any other apparatus provided that the apparatus outputs a signal asynchronous with an input signal to the outside.

The individual components designated by blocks in the drawings are all well known in the signal processing apparatus art and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A signal processing apparatus comprising:
   input means for inputting an image signal;
   first generation means for generating a first timing signal of a first frequency;
   reduction means for reducing a number of pixels of the image signal input by said input means in accordance with the first timing signal;
   a buffer memory for storing a pixel number reduced image signal output from said reduction means;

second generation means for generating a second timing signal of a second frequency different from the first frequency which is asynchronous with the first timing signal;

an image memory; and memory control means for transferring the pixel number reduced image signal from said buffer memory to said image memory and writing the pixel number reduced image signal into said image memory in accordance with the first timing signal, and for reading the pixel number reduced image signal from said image memory in accordance with the second timing signal.

2. An apparatus according to claim 1, further comprising:

output means for outputting the image signal read from said image memory to display means,
wherein said memory control means performs burst transfer of the image signal stored in said image memory to said output means in accordance with the second timing signal.

3. An apparatus according to claim 2, wherein said memory control means comprises a data bus, and wherein said memory control means transfers the image signal stored in said buffer memory to said image memory by performing time-division use of said data bus, and transfers the image signal stored in said image memory to said output means.

4. An apparatus according to claim 2, wherein said display means displays an image represented by the image signal output from said output means in synchronization with the second timing signal.

5. An apparatus according to claim 2, wherein said reduction means reduces the number of pixels of the input image signal in accordance with a number of pixels to be displayed on said display means.

6. An apparatus according to claim 1, wherein said input means comprises reproducing means for reproducing an image signal from a recording medium.

7. An apparatus according to claim 6, wherein said input means further comprises expansion means for expanding an amount of information of the image signal reproduced by said reproducing means, and wherein the image signal expanded by said expansion means is output to said reduction means.

8. An imaging apparatus comprising:

image pickup means for imaging an object in accordance with a first timing signal of a first frequency and for outputting an image signal;

reduction means for reducing a number of pixels of the image signal output from said image pickup means;

a buffer memory for storing a pixel number reduced image signal output from said reduction means;

an image memory; and memory control means for writing the pixel number reduced image signal stored in said buffer memory into said image memory by performing burst transfer in accordance with the first timing signal, and for reading the pixel number reduced image signal from said image memory in accordance with a second timing signal of a second frequency different from the first frequency which is asynchronous with the first timing signal.

9. An apparatus according to claim 8, further comprising:

output means for outputting the image signal read from said image memory to display means,
wherein said memory control means performs burst-transfer of the image signal stored in said image memory to said output means in accordance with the second timing signal.

10. An apparatus according to claim 9, wherein said memory control means comprises a data bus, and wherein said memory control means transfers the image signal stored in said buffer memory to said memory by performing time-division use of said data bus, and transfers the image signal stored in said memory to said output means.

11. An apparatus according to claim 9, wherein said display means displays an image represented by the image signal output from said output means in synchronization with the second timing signal.

12. An apparatus according to claim 9, wherein said reduction means reduces the number of pixels of the input image signal in accordance with a number of pixels to be displayed on said display means.

13. An apparatus according to claim 8, further comprising:

recording means for recording the image signal obtained by said image pickup means on a recording medium.

14. An apparatus according to claim 13, wherein said recording means comprises encoding means for encoding the image signal obtained by said image pickup means while compressing an amount of information thereof, and wherein the encoded image signal is recorded on the recording medium.

15. An apparatus according to claim 13, further comprising:

reproducing means for reproducing the image signal recorded on the recording medium; and selection means for selectively outputting the image signal obtained by said image pickup means or the image signal reproduced by said reproducing means to said reduction means.

16. An apparatus according to claim 15, wherein said reproducing means comprises expansion means for expanding an amount of information of the image signal reproduced from the recording medium, and wherein the expanded image signal is output to said selection means.

* * * * *